Patented Sept. 13, 1927.

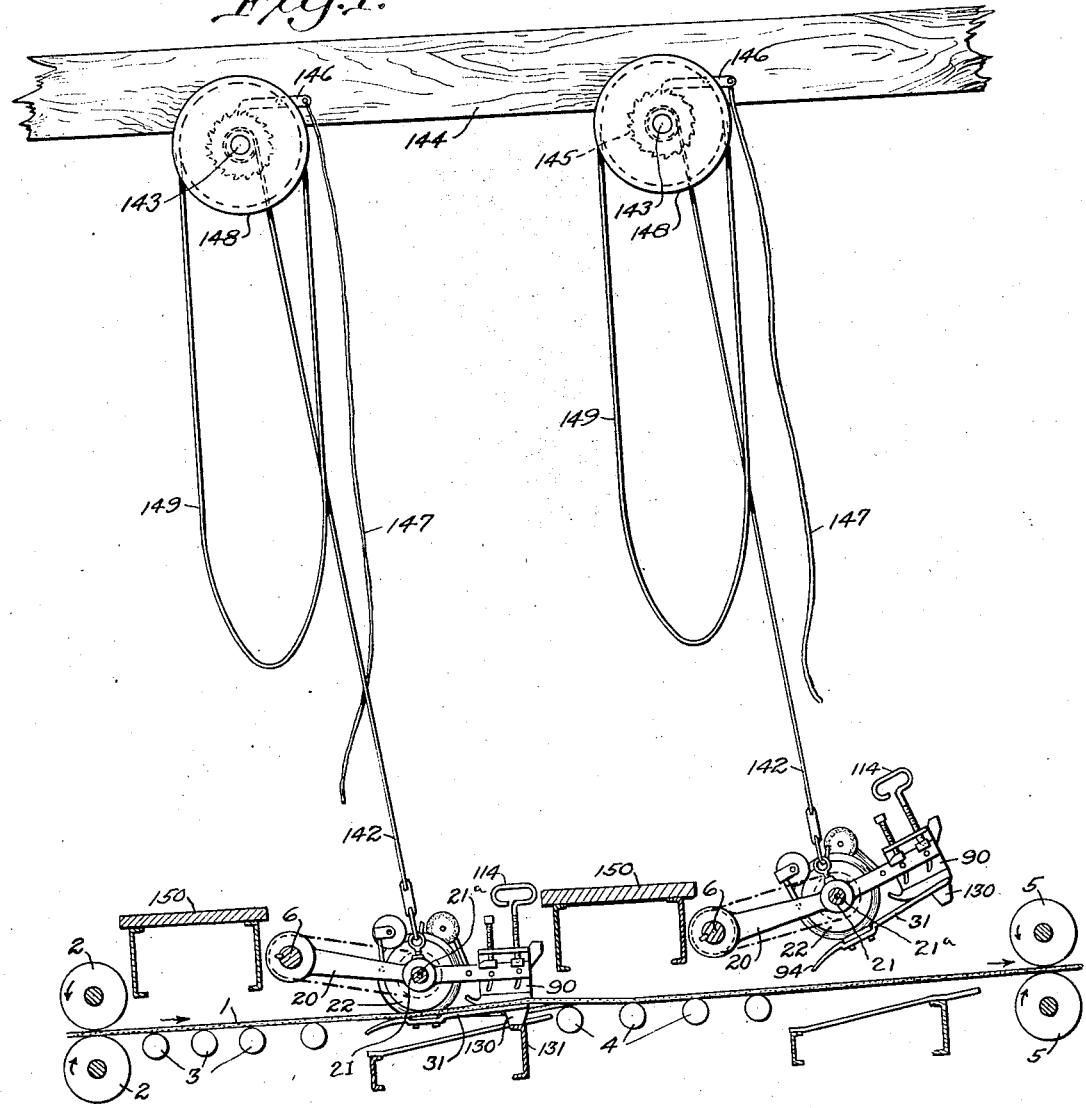

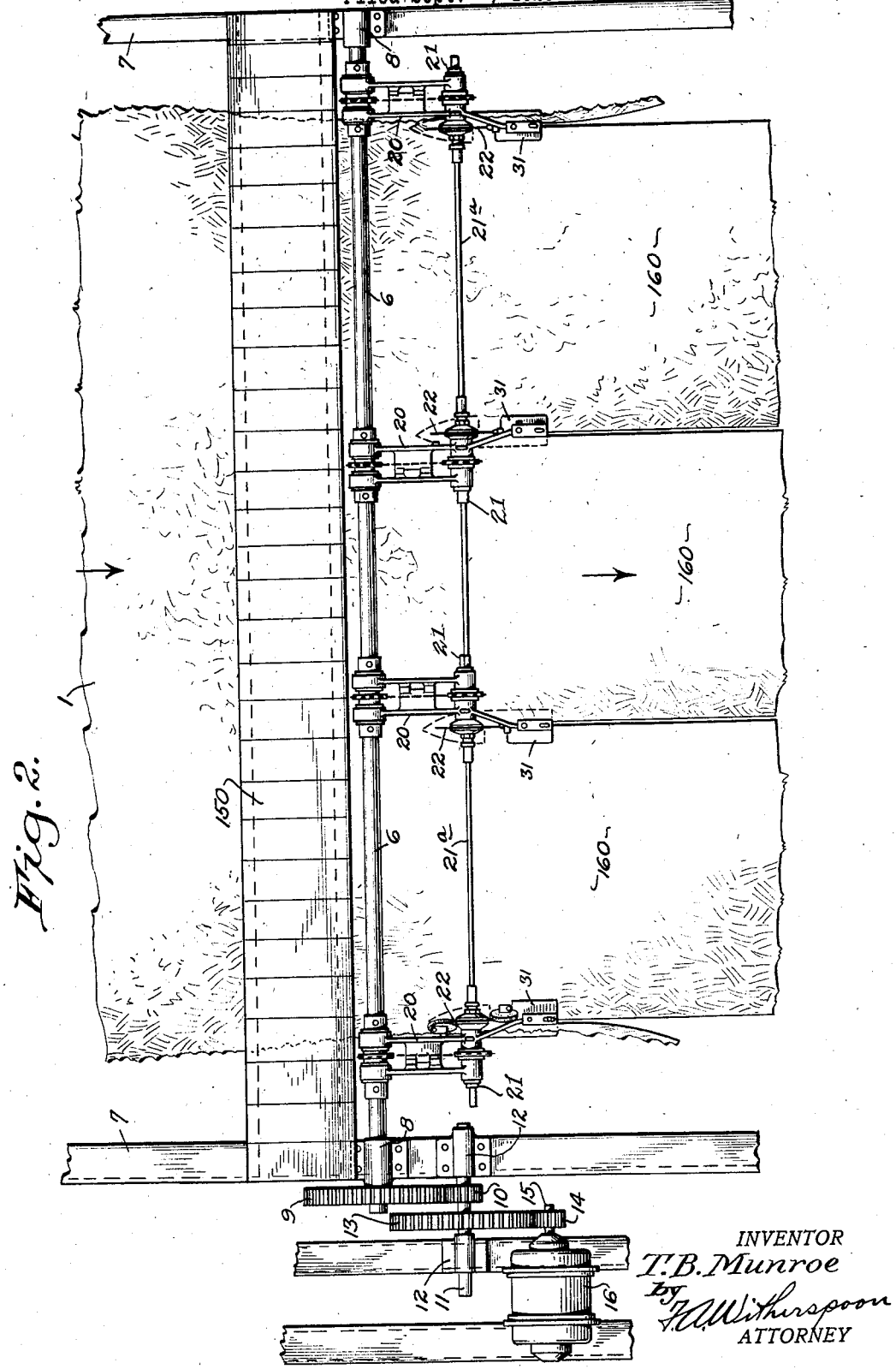

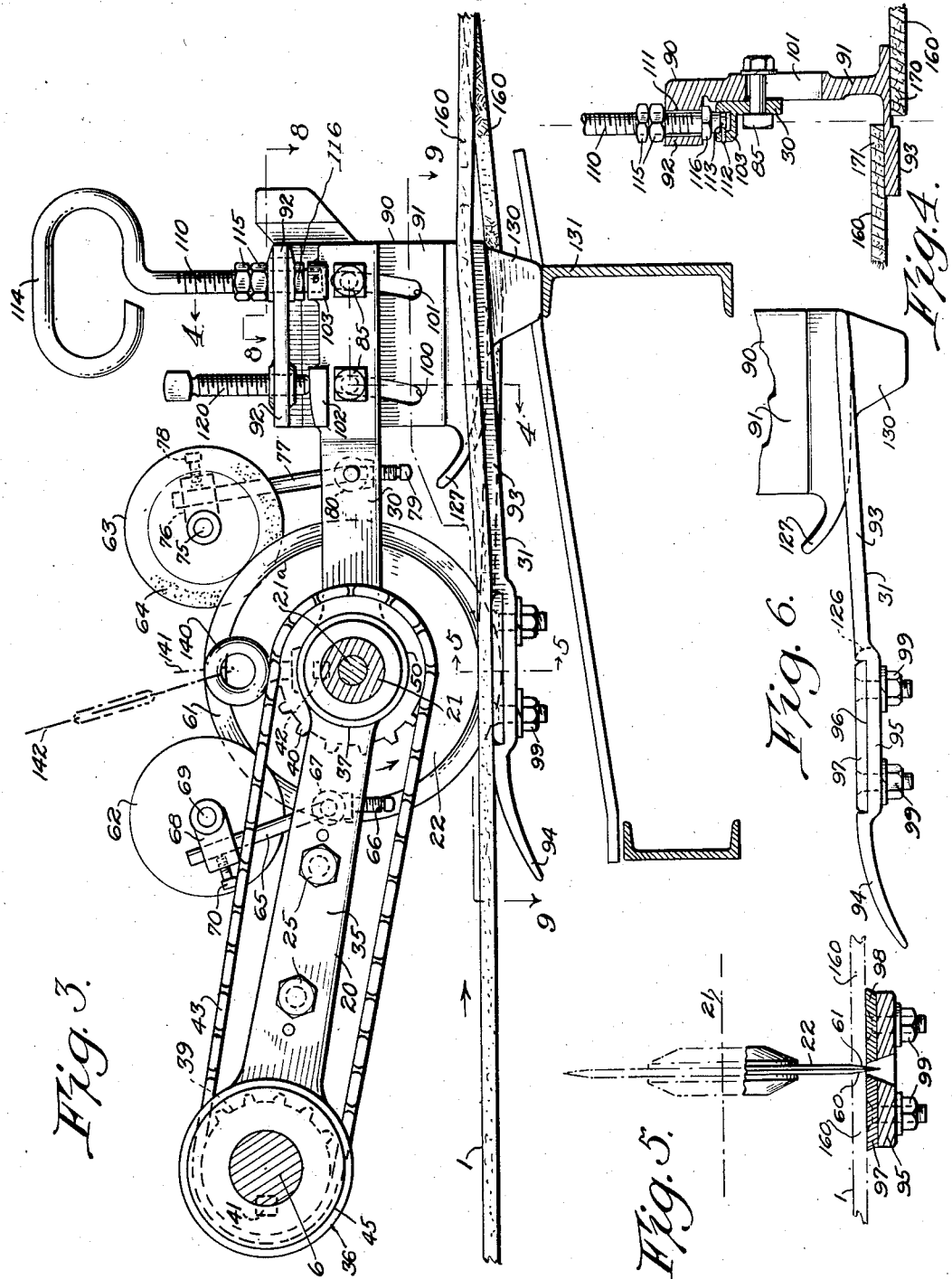

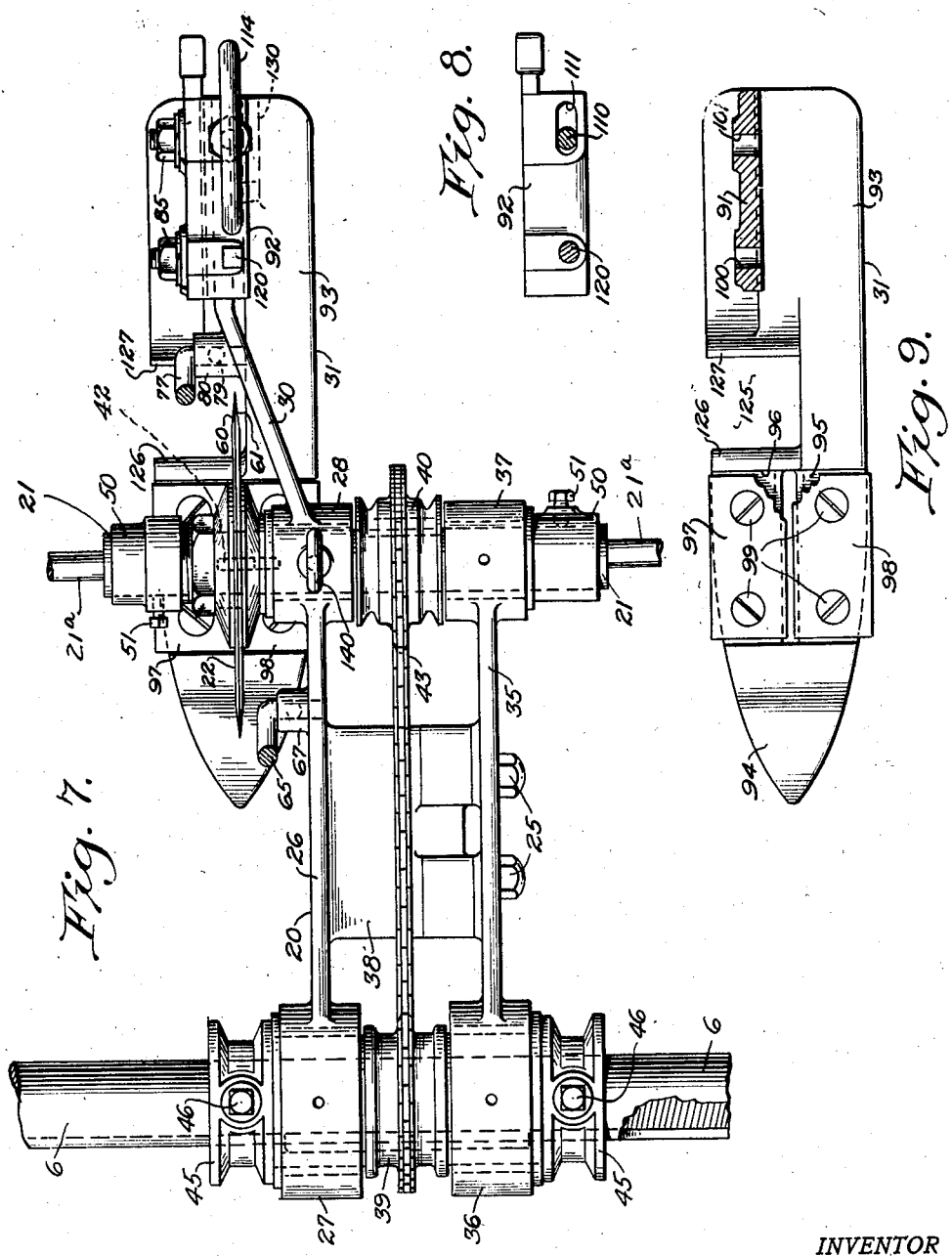

1,642,081

UNITED STATES PATENT OFFICE.

TREADWAY B. MUNROE, OF CHICAGO, ILLINOIS, ASSIGNOR TO DAHLBERG & COMPANY, INC., OF CHICAGO, ILLINOIS, A CORPORATION OF DELAWARE.

APPARATUS FOR SLITTING CONTINUOUSLY-MOVING MATERIAL.

Application filed September 4, 1925. Serial No. 54,529.

This invention relates to slitting apparatus for cutting sheets of moving material into suitable widths and has for its object to provide an apparatus simple in construction and more efficient in operation than those heretofore proposed.

With these and other objects in view the invention consists in the novel details of construction and arrangements of parts more fully hereinafter disclosed and particularly pointed out in the claims.

Referring to the accompanying drawings, forming a part of this specification, in which like numerals designate like parts in all the views:—

Figure 1 is a diagrammatic side elevational view of an apparatus made in accordance with this invention;

Figure 2 is a top plan view of one of the slitting units employed in an apparatus of this character;

Figure 3 is a side elevational view of one of the slitting units shown in Fig. 1;

Figure 4 is a sectional view taken on the line 4—4 of Fig. 3, and looking in the direction of the arrow;

Figure 5 is a sectional view taken on the line 5—5 of Fig. 3, and looking in the direction of the arrow;

Figure 6 is a fragmentary side elevational view of the shoe employed in the slitting unit;

Figure 7 is a top plan view in enlarged detail showing the arrangements of parts of the rotary cutter knife as illustrated in Fig. 3;

Figure 8 is a sectional view taken on the line 8—8 of Fig. 3 and looking in the direction of the arrows; and Figure 9 is a sectional view taken on the line 9—9 of Fig. 3 and looking in the direction of the arrows.

This invention is directed to an apparatus adapted to cut sheets of continuously moving material into suitable widths, which are later transversely cut into suitable lengths, thereby producing units of material of considerable cross sectional area which may be easily handled in building operations. However, it will of course be obvious that an apparatus of this nature may be used to slit material regardless of the use to which said material is placed subsequently. In this particular connection, however, the material which is desired to be slit is a material produced by the interlacing of vegetable fibers, producing a web of considerable toughness, compressibility, and lightness of weight. Heretofore this material has been cut into strips of suitable width by means of revolving saws which, however, it has been found is not desirable because the saw teeth have a tendency to pull the fibers of the material and thus produce a cut edge which is rough. This invention, on the other hand, produces a clear cut, obviating the undesirable features of the apparatus heretofore used.

Referring to the drawings, 1 represents the sheet of continuously moving material, 2 a pair of feed rolls located in front of the slitting apparatus, 3 a plurality of supporting rollers for the sheet of material 1, 4 a second plurality of supporting rollers for the sheet of material disposed between the slitting units, and 5 a second pair of feed rolls similar to the pair of feed rolls 2, but which are disposed behind the slitting units. Above the sheet of material 1 and extending entirely across said sheet is the shaft 6 suitably journaled to the side frame members 7, as at 8, and provided at what may be termed the front side of the machine, with a gear 9 on one end, meshing with a pinion 10 mounted on a shaft 11 supported in the journals 12. This shaft 11 also has the gear 13 mounted thereon and adapted to mesh with a pinion 14 carried by the shaft 15 of the electric motor 16 mounted upon suitable framework adjacent the apparatus. Thus it will be seen that power from said motor will be transmitted to the shaft 6.

Slidably engaging the shaft 6 is a plurality of frameworks 20 adapted to support short shafts 21 slidably mounted on a secondary shaft 21ª parallel to the shaft 6 and likewise extending transversely across the material to be slitted. Each shaft 21 has mounted thereon a rotary disk cutter 22 associated with each frame 20 of the device. By referring to Figs. 3 and 7, it will be seen that each frame 20 is made in two separable halves secured together as by the bolts 25. The purpose of this construction is to provide a connecting web 26 provided at one end with the collar 27 slidably engaging the shaft 6, and provided at its other end with a collar 28 slidingly engaging the cutter shaft 21. The collar 28 has integrally attached thereto an extending arm 30 which is adapted to support a shoe generally indicated by the numeral 31 associated with the rotary disk cutter. The other half of the frame 20 has the web portion 35 at one end of which is disposed the collar 36 similar to the collar 27 and also slidingly engaging the rotary cutter shaft 21, but the webs 26 and 35, it will be noticed, are separated as by the spacing web 38, to provide spaces on the shafts 6 and 21 for sprocket wheels 39 and 40, respectively. That is to say, to shaft 6 between the collars 27 and 36, is suitably secured, as by the key 41, the sprocket wheel 39, and to the shaft 21 between the collars 28 and 37 is likewise secured, as by the key 42, the sprocket wheel 40, which is connected to the sprocket wheel 39 as by the sprocket chain 43. Suitable locking collars 45 are rigidly mounted on the shaft 6, as by means of the set screws 46, to keep the frame 20 from any lateral displacement on the shaft 6 after said frame has been adjusted to a predetermined position.

This rotary cutter knife 22 is mounted on the shaft 21 adjacent to the outer side of the collar 28 of the frame 20 and suitably secured thereto in any way as by the key 42, and locking collars 50 are suitably secured to the shaft 21, as by the set screws 51, to keep the frame 20 and cutter 22 from longitudinal displacement on the shaft 21 after said frame 20 has been predeterminedly adjusted relative to shaft 6 and 21. From what has been just described it will therefore be apparent that power from any source such as an electric motor 16 in Fig. 2 will be transmitted to the rotary cutter 22 through the gears 14, 13, 10, 9, shaft 6, by means of the sprocket wheels and sprocket chain 43, to the shaft 21, upon which said cutter is rigidly mounted.

The disk cutter 22 is provided with a knife or V-shaped cutting edge formed by the two oppositely disposed bevel surfaces 60 and 61. This edge is maintained in a sharp condition by the provision of wheels 62 and 63 each provided with an abrasive surface 64 adapted to contact with the bevel surfaces 60 and 61. The wheel 62 is mounted upon the web 26 of the framework 20. This mounting comprises a rod 65 the lower end of which is angularly bent and secured as by the set screw 66 in the boss 67 on the web 26. The other end of the rod 65 slidingly engages a bracket member 68 mounted on the axle 69 of the wheel 62, and maintained in adjusted relation to said bracket as by means of the set screw 70. The other abrading wheel 63 is mounted in a similar manner to the extension 30 of the frame 20. That is to say, the axle 75 of the wheel 63 has mounted thereon the bracket member 76 slidably engaging one end of a bar 77 to which it is secured in adjusted position as by the set screw 78. The other end of the bar 77 is angularly bent and secured as by the set screw 79 in an adjusted position in the boss 80 carried by the extension 30. With such a construction it will therefore be apparent that the abrading wheels 62 and 63 may be adjusted relatively to the bevel surfaces 60 and 61 of the cutter so as to maintain a sharp edge on the cutter disk 22.

The extreme end portion of the extension 30 of the frame 20 is adapted to receive bolts 85 by means of which a foot member generally indicated by the numeral 90 is secured to said frame 20. This foot member 90 comprises a vertically disposed web portion 91 having the angularly disposed flange 92 at the top portion thereof, and provided at its lower extremity with an L-shaped plate 93. This plate 93 extends forwardly and terminates in a downwardly curved and pointed toe 94, see Figs. 3, 6, 7 and 9. Adjacent the curved toe portion 94 the plate 93 is provided with a dropped portion 95 providing the recess 96 within which is adapted to be secured as by the bolts 99, a pair of parallel spaced anvil blocks 97 and 98 respectively co-operating with the cutter disk 22, see Figs. 5 and 6. That is to say, the anvil blocks 97 and 98 constituting bottom cutting plates are disposed in the vertical plane of the cutter shaft 21 and to either side of the vertical plane of the cutter disk 22 and are so spaced from each other as to permit the blade of said disk to pass between said blocks whereby the material will be cut cleanly as it moves over said blocks.

The entire frame 90 may be adjustably secured to the frame 30 by means of the bolts 85, and to permit such adjustments slots 100 and 101 are provided in the web portion 91, said slots being disposed longitudinally in arcs of concentric circles having as their center the center of the shaft 21. To aid in this adjustment, the upper edge portion of the extension 30 is provided with the lugs 102 and 103 disposed substantially opposite the slots 100 and 101. The lug 103 is recessed as clearly indicated in Fig. 4 to receive the lower end of a lifting device having a screw threaded shank 110 adapted to slidingly engage the aperture 111 provided in the flange 92 of the foot frame 90. The lifting device is rotatably secured to the lug 103 by means of the pin 112 associated therewith and engaging the annular groove 113 on the end of the shank 110. The other end of the lifting device is provided with a handle 114 by means of which adjustment of the anvil blocks 97 and 98 relative to the cutter disk 22 may be made, as will be presently described, while associated with the shank 110 and the flange 92 are upper and lower locking nuts 115 and 116 respectively to secure the parts in adjusted positions. The flange 92 of the foot frame 90 is threaded to receive the screw 120 passing through said flange and bearing against the upper surface of the lug 102.

The bottom plate 93 of the foot frame 90 is cut away to provide the opening 125 for a purpose that will be presently disclosed, and one edge 126 of said opening is rounded as clearly seen in Figs. 6 and 9, while the opposite edge 127 is curved upwardly to form a guide for the sheet of material. With particular reference to Figs. 1 and 3 it will be noted that a heel 130 extends below the bottom plate 93 of the foot frame 90 and is adapted to rest on a suitable support such as the channel iron 131 underneath the moving sheet of material and rigidly secured to the frame work of the machine to hold the cutter and its associated frame in operative cutting position with relation to the moving sheet of material.

Each of the cutters 22 may be moved into and out of operative position relative to the moving sheet 1. For this purpose a ring or eye 140 is provided, in the collar 28 of the frame 20, adapted to receive the hook 141 on one end of a lifting cable 142 adapted to be operated by any well known means. Such a means is illustrated in Fig. 1 as comprising a drum 143 mounted on an overhead beam 144 and provided with a ratchet 145 engageable with a pawl 146 controlled by a pull cord 147. A sheave 148, rigid with the drum 143, and an endless rope or chain 149 passing over said sheave furnishes the means for rotating the said drum, oscillating the frame 20 about shaft 6 as a center, thus raising or lowering the cutter 22 associated therewith. Extending across and disposed above the moving sheet is a platform walkway 150, associated with each unit of cutters, suitably supported by the side frame members 7 of the entire machine to enable an attendant to operate each lifting cable 142.

In Fig. 1 there is illustrated two cutting units, both identical in construction and each separately driven and controlled. One advantage of providing two units is to enable one unit to be substituted for the other in case of accident. Another advantage lies in the fact that the cutter 22 of one unit may be adjusted longitudinally of their associated shafts 6 and 21ª and secured thereto in such predetermined positions as will cause said cutters 22 to slit the moving sheet 1 into strips having widths different from the strips, such as 160, see Fig. 2, formed by the cutters of the other unit. This is an important feature in that were there but one unit of cutters provided, the entire machine would have to be stopped while the cutters 22 were adjusted to the required positions in order not to waste a substantial quantity of the sheet.

When such a change is made, the pointed toe 94 of the foot 90 associated with each cutter 22, being downwardly curved, may be forced through the sheet by pressure applied to the handle 114. Or, the attendant may cut or jab holes in the moving sheet in advance of each cutter 22 to allow the toe 94 and the associated base plate 93 to pass through said sheet.

The operation of the device will be apparent from the foregoing description but may be summarized as follows. The vegetable fibers making up this sheet are obtained from bagasse, or sugar cane from which the sugar juices have been extracted, are washed, partially cooked without destroying their original strength and resiliency each of which is so great as to be comparable with cotton or linen fibers. They are then passed through forming rolls by means of which the fibers are interlaced with each other thus producing due to their abnormal strength a very tough, matted sheet which after passing through rolls and reduced to a thickness of about one-half inch is then dried. Such a sheet material has so great a strength, toughness and rigidity of body that it makes the same a most excellent substitute for lumber. This sheet is formed by a continuous process and finally reaches the feed rolls 2, conveyor rolls 3 and cutters 22. These cutters slit the sheet into strips of predetermined widths which then pass over the conveyor rolls 4, and pass between the feed rolls 5 to be subsequently cut transversely into predetermined lengths suitable for building uses.

It is to be observed, with particular reference to Figs. 1, 3, 4 and 5, that the frame 20 carrying the cutter 22, supports a second frame 90 having a vertically disposed web portion 91 and a base plate or foot 93 carrying the anvil blocks or lower cutting members 97 and 98. Further it will be observed, as well illustrated in Figs. 3 and 4, that the foot 93 is adapted to pass through the slit formed by the cutter 22. In other words the foot 93 rests on top of one edge portion 170 of the slit whereas the other edge portion 171 of said slit rests on top of said foot 93. This has the tendency of raising one of the strips 160 into a horizontal plane different from the horizontal plane of its adjacent strip thereby creating a tension in the sheet 1 at the cutting point whereby the cutting action is materially aided. Therefore, the second frame 90 serves a purpose of aiding the cutting action and providing a means, comprising the anvil blocks 97 and 98 associated with the knife edged cutter 22, for producing a slit having clean cut and smooth edges. The fin 130 supports the cutting element, in operative position.

In order to adjust the anvil blocks 97 and 98 relatively to the cutter disk 22, one or both of the bolts 85 is loosened and the screws 110 and 120 turned to swing the said anvil blocks nearer to the cutting edge.

It is well known that rotary knife edged and other cutters have heretofore been used in cutting various sheet like materials but in so far as I am aware such a cutting device has never been used for tough, fibrous bagasse material. Further, prior to this invention a great deal of time and money has been spent in endeavors to discover a means of cutting this particular material successfully but without success due largely to the very great length and strength of the individual bagasse fibers. Straight knives were found useless. Circular saws were tried and found to cut the material, but the cut edges were very rough or torn out due to the saw teeth pulling the very strong, tough and long fibers constituting the sheet material out of the body of the same instead of severing them. This invention, on the other hand, provides a rotary knife which makes an exceedingly and surprisingly smooth or even cut edge, with no sign of tearing or pinching. In this connection it was also discovered that if the knife was rotated too slowly there would be a pinching action which would not only tend to buckle the knife, but would also give an unsightly edge to the material. On the other hand, were the knife run too fast, the heat produced in the steel blades from its frictional engagement with the fibrous sheet would not be dissipated to the air fast enough, with the result that the blade would become quickly overheated and warp out of shape. It was, however, finally discovered that by rotating the knife 22 only from one to five times as fast as the travel of the moving sheet 1, the said knife would slit the material perfectly. But it was also discovered that the rotary cutters would dull in comparatively a short length of time and therefore it was further found to be necessary to provide the adjustable abrading wheels 62 and 63 or other sharpening means for continually keeping the blades sharp. After thus regulating the speed and sharpness of the knife edged cutter it further was found that the slitting operation was commercially satisfactory.

With special reference to Fig. 2 it will be observed that the cutter elements of each unit are made in rights and lefts. This is necessary because of the different horizontal planes occupied by the adjacent edges of each slit. In other words, the opposite edges of the strip 160 to the left in Fig. 2 pass through the openings 125 of the shoes 31, see Fig. 9, and then travel underneath the foot portion 93 of their associated cutters. The opposite edges of the middle strip 160, on the other hand, pass over the top of the foot portion 93 of the shoes and cutters associated therewith as indicated by the dotted lines. To avoid a warping effect of each strip 160 therefore, the cutting elements are made opposites and alternately mounted as shown in said Fig. 2.

It is obvious that those skilled in the art may not vary the details of construction and arrangements of parts without departing from the spirit of the invention but this system of cutting may be applied to the fibrous wall board sheet material known on the market as insulite, as well as other sheet materials not necessary to specifically mention, therefore it is not desired to be limited to the foregoing disclosure except as may be required by the claims.

What is claimed is:—

1. In a machine for slitting a fibrous sheet the combination of a rotating cutter disposed above said sheet; supporting means for said cutter including a frame provided with an anvil disposed below said sheet and cooperating with said cutter; and means associated with said frame to raise one and lower the other of the cut edges of said sheet to augment the cutting action.

2. In a machine for slitting a fibrous sheet the combination of a rotating cutter disposed above said sheet; supporting means for said cutter adjustable thereto including a frame provided with an anvil disposed below said sheet and cooperating with said cutter; and means associated with said frame to raise one and lower the other of the cut edges of said sheet to augment the cutting action.

3. In a machine for slitting a fibrous sheet the combination of a rotating cutter disposed above said sheet; supporting means for said cutter adjustable thereto in the same plane including a frame provided with an anvil disposed below said sheet and cooperating with said cutter; and means associated with said frame to raise one and lower the other of the cut edges of said sheet to augment the cutting action.

4. In a machine for slitting a fibrous sheet the combination of a rotating cutter disposed above said sheet; supporting means for said cutter including a jointed frame provided with an anvil disposed below said sheet and cooperating with said cutter; and means associated with said frame to raise one and lower the other of the cut edges of said sheet to augment the cutting action.

5. In a machine for slitting a fibrous sheet the combination of a rotating cutter disposed above said sheet; supporting means for said cutter including a jointed frame provided with an anvil disposed below said sheet and adjustably cooperating with said cutter; and means associated with said frame to raise one and lower the other of the cut edges of said sheet to augment the cutting action.

6. In a machine for slitting a fibrous sheet the combination of a rotating cutter and a main power shaft therefor disposed above said sheet; supporting means for said cutter, oscillative about said shaft including a frame provided with an anvil disposed below said sheet and cooperating with said cutter; and means associated with said frame to raise one and lower the other of the cut edges of said sheet to augment the cutting action.

7. In a machine for slitting a fibrous sheet the combination of a rotating cutter and a main power shaft therefor disposed above said sheet; supporting means for said cutter, oscillative about said shaft in a vertical plane, said means including a frame provided with an anvil disposed below said sheet and cooperating with said cutter, and means associated with said frame to raise one and lower the other of the cut edges of said sheet to augment the cutting action.

8. In a machine for slitting a fibrous sheet the combination of a rotating cutter disposed above said sheet; supporting means for said cutter including a frame provided with an anvil disposed below said sheet and cooperating with said cutter; and means including guides associated with said frame to raise one and lower the other of the cut edges of said sheet to augment the cutting action.

9. In a machine for slitting a fibrous sheet the combination of a rotating cutter disposed above said sheet; supporting means for said cutter including a frame provided with an anvil disposed below said sheet and cooperating with said cutter; and means including oppositely directed guides associated with said frame to raise one and lower the other of the cut edges of said sheet to augment the cutting action.

10. In a machine for slitting a fibrous sheet the combination of a rotating cutter disposed above said sheet; supporting means for said cutter including a frame provided with an anvil disposed below said sheet and cooperating with said cutter; and means including oppositely directed guides, one of which supports said anvil, both guides associated with said frame to raise one and lower the other of the cut edges of said sheet to augment the cutting action.

11. In a machine for slitting a fibrous sheet the combination of a rotating cutter disposed above said sheet; supporting means for said cutter including a frame provided with an anvil disposed below said sheet and cooperating with said cutter; and means associated with said frame to raise one and lower the other of the cut edges of said sheet into parallel planes to augment the cutting action.

12. In a machine for slitting a fibrous sheet the combination of a rotating cutter disposed above said sheet; supporting means for said cutter including a frame provided with an anvil disposed below said sheets and cooperating with said cutter; and means associated with said frame to raise one and lower the other of the cut edges of said sheet to augment by shearing movement the cutting action.

13. In a machine for slitting continuously moving sheet material the combination of a power shaft; a frame mounted on said shaft; a second shaft supported in said frame and driven from said power shaft; a knife edged cutter mounted on said second shaft and disposed above said sheet material; and a second frame secured to said first named frame and provided with a foot adapted to extend beneath said sheet material when in operative position.

14. In a machine for slitting continuously moving sheet material the combination of a power shaft; a frame mounted on said shaft; a second shaft supported in said frame and driven from said power shaft; a knife edged cutter mounted on said second shaft and disposed above said sheet material; and a second frame secured to said first named frame and provided with a foot cooperating with said cutter and adapted to extend beneath said sheet material when in operative position.

15. In a machine for slitting continuously moving sheet material the combination of a power shaft; a frame mounted on said shaft; a second shaft supported in said frame and driven from said power shaft; a continually sharpened knife edged cutter mounted on said second shaft and disposed above said sheet material; and a second frame adjustably secured to said first named frame and provided with a foot adapted to extend beneath said sheet material when in operative position.

16. In a machine for slitting continuously moving sheet material the combination of a power shaft; a frame mounted on said shaft; a second shaft supported in said frame and driven from said power shaft; a knife edged cutter mounted on said second shaft and disposed above said sheet material; a second frame secured to said first named frame and provided with a foot adapted to extend beneath said sheet material when in operative position; and a support for said second frame.

17. In a machine for slitting continuously moving sheet material the combination of a power shaft; a frame mounted on said shaft; a second shaft supported in said frame and driven from said power shaft; a knife edged cutter mounted on said second shaft and disposed above said sheet material; means to adjust said cutter longitudinally of said second shaft; and a second frame secured to said first named frame and provided with a foot adapted to extend beneath said sheet material when in operative position.

18. In a machine for slitting continuously moving sheet material the combination of a power shaft; a frame mounted on said shaft; a second shaft supported in said frame and driven from said power shaft; a knife edged cutter mounted on said second shaft and disposed above said sheet material; a second frame secured to said first named frame and provided with a foot adapted to extend beneath said sheet material when in operative position; and hoisting means to move said cutter and second shaft into and out of operative position while said sheet material is moving.

19. In an apparatus for slitting a sheet the combination of a frame supporting a revolving knife edged cutter; means for continually sharpening said cutter while in action; and means for holding the edges of the slit in different planes during the cutting action.

In testimony whereof I affix my signature.

TREADWAY B. MUNROE.